UNITED STATES PATENT OFFICE.

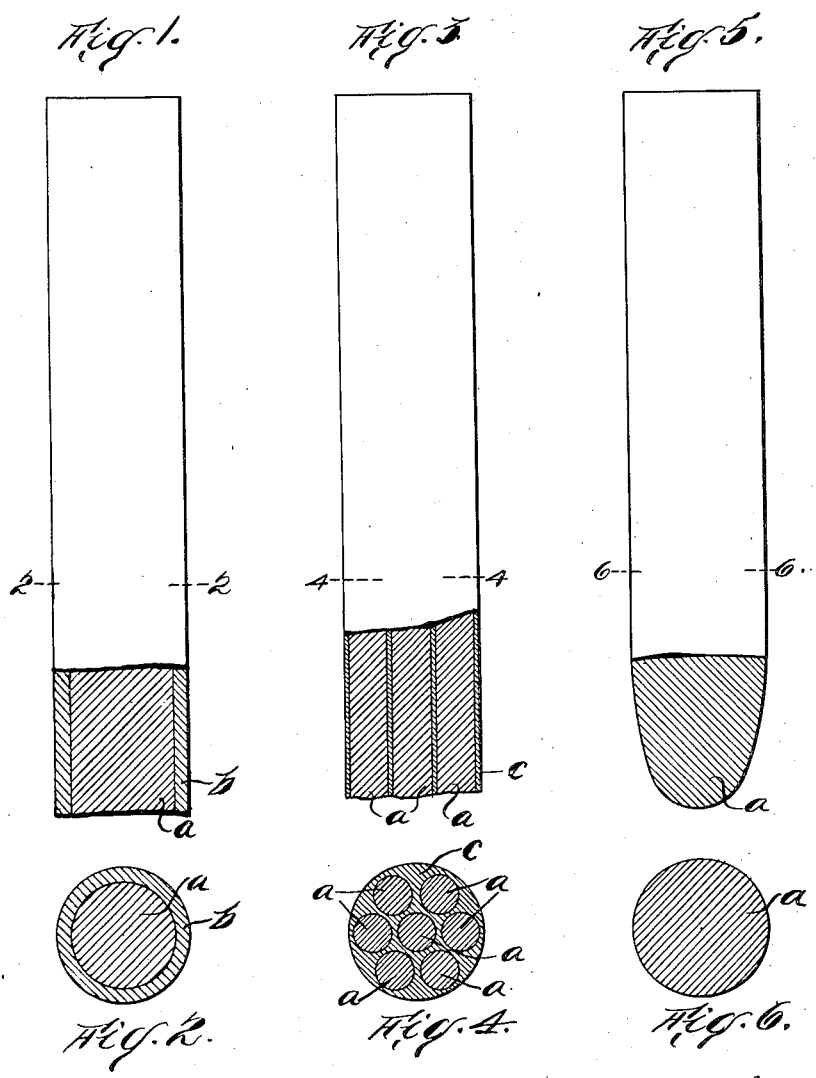

ISADOR LADOFF, OF CLEVELAND, OHIO, ASSIGNOR, BY MESNE ASSIGNMENTS, OF THIRTY ONE-HUNDREDTHS TO WALTER D. EDMONDS, OF BOONVILLE, NEW YORK.

ARC-LIGHT ELECTRODE.

1,112,458.  Specification of Letters Patent.  Patented Oct. 6, 1914.

Application filed June 1, 1911. Serial No. 630,545.

*To all whom it may concern:*

Be it known that I, ISADOR LADOFF, a citizen of the United States, and a resident of Cleveland, in the county of Cuyahoga and State of Ohio, have invented certain new and useful Improvements in Arc-Light Electrodes, of which the following is a specification.

My present invention relates to so-called "flaming" arc electrodes of the type composed essentially of so-called mineralized carbon, these being, loosely speaking, electrodes composed largely of carbon with which has been associated various mineral substances to increase candle power efficiency, etc., such association imparting to an extent to the resulting arc the said "flaming" and other characteristics incidental to electrodes composed principally of metallic substances as distinguished from carbon. To these ends have been hitherto associated with the constituent carbon of the electrode various compounds of metallic character, for example calcium salts, particularly calcium fluorid, which, though increasing intensity of light, has proved unsatisfactory owing to its reddish color, especially when the wattage drops below a certain minimum as is unavoidable in commercial installations. To overcome such defects resort has also been had, with more or less indifferent success, to additions to the calcium of other fluorids, *e. g.* sodium fluorids, also borates, rare earths, carbids of boron and of titanium, and even titanium oxid. Even tungstate of calcium has been tried as a substitute for the calcium fluorid or part of it, though this has the disavantage of being reduced in the arc to metallic tungsten which rectifies the current. But the flaming arcs from the types of electrodes mentioned have hitherto been characterized by undesirable flickering and changes in color.

The only titanium compound hitherto found serviceable for the purpose mentioned on alternating current lines has been, so far as I know, titanium carbid, but this substance, owing to its instability, has proved also undesirable, breaking up in the arc stream into carbon which too quickly burns away and titanium which too rapidly oxidizes.

The object of my present invention is to provide means whereby mineralized carbon electrodes giving flaming arcs may, without impairing their operativeness in alternating currents, develop more efficient, steady, and whiter arcs than heretofore. This object I attain by my improvements as hereinafter described.

My researches have demonstrated that the mineral additions heretofore made to the carbon as heretofore noted cause the electrodes to behave unsatisfactorily in the particulars mentioned largely because of insufficient homogeneity and harmoniousness of behavior and action as regards the physical, chemical, and light-giving properties of the constituting ingredients. I have now discovered that a substance hitherto, I believe, unutilized for the purpose, towit, calcium titanate, $CaTiO_3$, known as perofskite possesses such properties as, when properly associated with carbon in an arc electrode, to realize the said objects of my present invention, also that the desired effects attributable to said properties of calcium titanate are enhanced by association therewith and carbon, of halogen compounds of titanium, preferably, for example, sodium titanofluorid ($Na_2TiFl$) or such equivalent therefor as one of the following: titanium trifluorid ($TiF_3$), titanium tetrafluorid ($TiF_4$), titanium tetrafluorid hydrated ($TiF_4, 2H_2O$), ammonium tetrafluorid ($TiF_4, NH_3$), hydrogen titanofluorid ($H_2TiF_6$), potassium titanofluorid ($K_2TiF_6$), potassium titanofluorid hydrated ($K_2TiF_6, H_2O$), sodium titanofluorid ($Na_2TiF_6$), sodium titanofluorid with excess of hydrofluoric acid ($Na_2TiF_6, NaF_2H$), ammonium titanofluorid ($NH_4)_2TiF_6$, ammonium titanofluorid with excess of ammonium fluorid ($NH_4)_2TiF_6$, $NH_4F$, titanium bromid ($TiBr_4$), titanium iodid ($TiI_4$), or also chlorids of titanium, bromids of titanium, iodids of titanium, or organic salts of titanium such, for instance, as oxalate of titanium.

The superior efficiency and other desired qualities of my electrodes are, I believe, attributable not only to their novel ingredients as above stated, but also to my manner of associating these with each other and with carbon in the electrode whereby homogeneity is increased. I therefore prefer to produce preliminarily an intimate, homogeneous, cohesive mixture of the said ingredients as follows: I have for example taken of calcium titanate ($CaTiO_3$) 36 parts, 34 parts of titanofluorid of an alkaline metal, towit, sodium titanofluorid ($Na_2TiFl$) and powdered these ingredients and mixed them thoroughly together with 30 parts of powdered calcined carbon. To this mixture I have imparted the coherence of stiff paste by adding thereto and mixing therewith a suitable binder in this instance tar. The resulting product was then applied in the well known manner as coring material to fill the bores of usual electrode skeletons composed of pure carbon and the so cored electrodes dried at 200° to 300° C. to constitute one form of my said improved electrode. Even more perfect homogeneity may be secured by fusing the aforesaid mixture of calcium titanate and other last mentioned compound of titanium, or aforesaid equivalents therefor, into a completely homogeneous mass. Said mass is then pulverized in any convenient manner, the resultant powder thoroughly mixed with powdered carbon, coherence imparted by mixing with any suitable binder, the bores of the skeleton electrode filled with the resulting product and the whole dried as before.

It will be understood that my electrode may, though unpreferably, be composed entirely of my mixture made as aforesaid of calcium titanate, carbon, and compound of titanium with the halogens or its equivalent, mixed with a binder and sufficiently dried, or even fused together or treated in any other well known way to impart thereto requisite mechanical strength, but in such case the proportion of carbon content should be increased so as to constitute a preponderance of carbon in the electrode, it being preferable in all cases that the aggregate percentage of titanium compounds in the electrode should not exceed its total percentage of carbon including that in my mixture and in the carbon skeleton if latter is, as is preferable, employed. The total percentage of carbon which I deem most satisfactory in results is from 60 per cent. to 73 per cent. of the whole electrode.

Referring to the accompanying drawings, Figure 1 is a view partly in elevation and partly in central longitudinal section of one form of my electrode; Fig. 2 a transverse section on line 2—2 of Fig. 1; Fig. 3 a view similar to Fig. 1 of another form of my electrode; Fig. 4 a transverse section on line 4—4 of Fig. 3; Figs. 5 and 6 similar views of another form of my electrode.

Similar reference characters indicate similar parts.

*a* indicates my aforesaid homogeneous mixture of calcium titanate, carbon and halogen compound or other organic salt of titanium.

*b* indicates the shell of carbon, constituting the skeleton above referred to, which is, in this instance, of cylindrical type having its bore cored with my said mixture *a*.

*c* indicates another type of carbon skeleton multi-bored and multi-cored with my said mixture.

What I claim as new and desire to secure by Letters Patent is the following, viz:—

1. An arc light electrode characterized as yielding a flaming arc, as containing a preponderance of carbon and as containing also calcium titanate.

2. An arc light electrode characterized as yielding a flaming arc, as containing a preponderance of carbon and as containing also calcium titanate and an organic salt of titanium.

3. An arc light electrode characterized as yielding a flaming arc, as containing a preponderance of carbon and as containing also calcium titanate mixed with carbon and with an organic salt of titanium.

4. An arc light electrode characterized as yielding a flaming arc, as containing a preponderance of carbon and as containing also calcium titanate mixed with carbon and a halogen compound of titanium.

5. An arc light electrode characterized as yielding a flaming arc, as containing a preponderance of carbon and as containing also calcium titanate and titanofluorid of an alkaline metal.

6. An arc light electrode characterized as yielding a flaming arc, as containing a preponderance of carbon and as containing also calcium titanate mixed with carbon and with titanofluorid of an alkaline metal.

7. An arc light electrode characterized as yielding a flaming arc, as containing carbon and as containing also calcium titanate.

ISADOR LADOFF.

Witnesses:
M. C. BIXBY,
JOHN R. ORPUTT.